United States Patent [19]

Maejima

[11] 4,248,579

[45] Feb. 3, 1981

[54] FILM EXTRUSION DIE

[75] Inventor: Mokichi Maejima, Tokyo, Japan

[73] Assignee: Jyohoku Seiko Co., Ltd., Tokyo, Japan

[21] Appl. No.: 83,444

[22] Filed: Oct. 10, 1979

[51] Int. Cl.³ .......................... B08B 1/00; B29D 7/04
[52] U.S. Cl. .............................. 425/227; 15/236 R; 15/248 R; 30/169; 264/39; 264/169; 264/176 R; 425/381; 425/466
[58] Field of Search ............... 425/466, 381, 151, 458, 425/87, 225, 227, 229; 264/169, 176 R, 39; 15/236 R, 248 R; 30/169

[56] References Cited

U.S. PATENT DOCUMENTS

| | | | |
|---|---|---|---|
| 2,811,767 | 11/1957 | Dufford | 425/458 |
| 3,018,515 | 1/1962 | Sneddon | 425/466 |
| 3,116,502 | 1/1964 | Gerber | 15/248 R |
| 3,238,563 | 3/1966 | Hoffman | 425/466 |
| 3,711,235 | 1/1973 | Bunte | 425/466 |
| 3,804,569 | 4/1974 | Walker | 425/225 |
| 3,829,274 | 8/1974 | Melead | 425/466 |
| 3,832,120 | 8/1974 | Shaffer | 425/466 |
| 3,975,475 | 8/1976 | Foley | 264/169 |
| 4,057,385 | 11/1977 | Yazaki et al. | 425/466 |

*Primary Examiner*—Jeffery R. Thurlow
*Attorney, Agent, or Firm*—Jordan and Hamburg

[57] ABSTRACT

A T-shaped extrusion die for forming transparent, uniformly thick and edge beads-free synthetic resins with a high efficiency, comprising a die body having a manifold for containing a supply of the synthetic resin in molten state and a slot-like passage for the molten resin, adjustable lips for forming a slot-like discharge orifice, inner deckles useful mainly for varying the edge thickness of the resulting extruded film, support rods for supporting the inner deckles, and inner deckle rods for regulating the width of the resulting extruded film, the inner deckles being moved by moving the support rods in the manifold in sliding contact with the surface thereof to vary the edge thickness of the resulting film, the inner deckle and inner deckle rod being kept somewhat away from each other thereby to permit free movement of the latter even under a high molten resin pressure. In one embodiment, a remover for an oxidized or scorched resin is disclosed.

6 Claims, 10 Drawing Figures

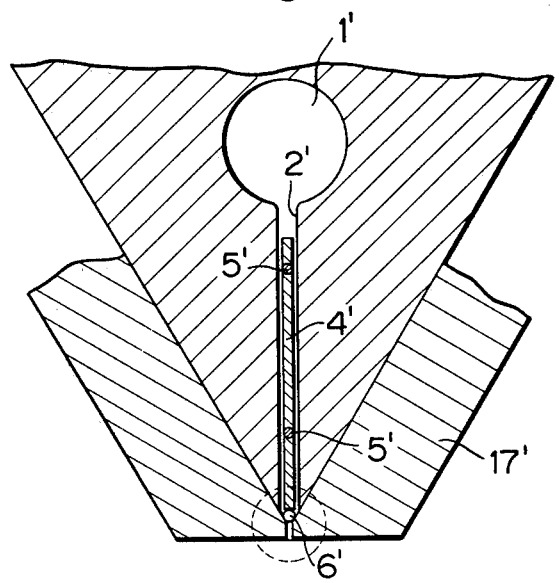
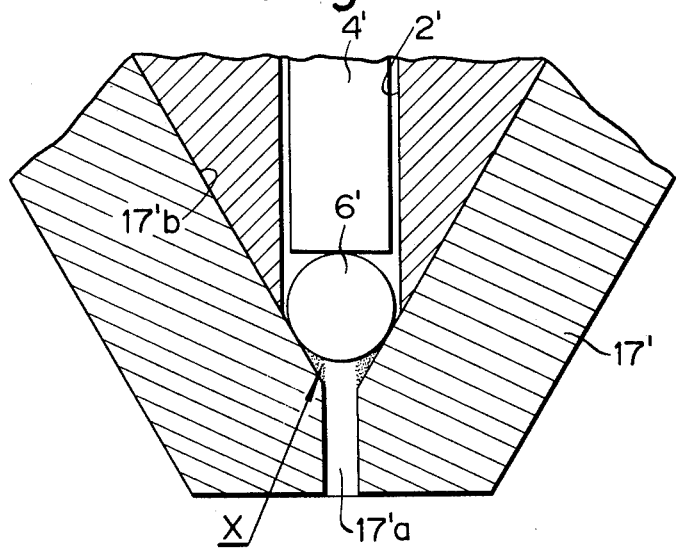

Fig. 6
Fig. 8
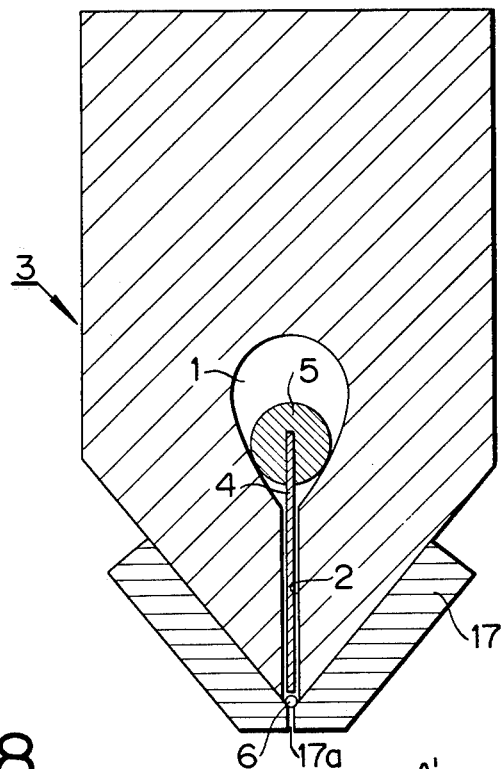
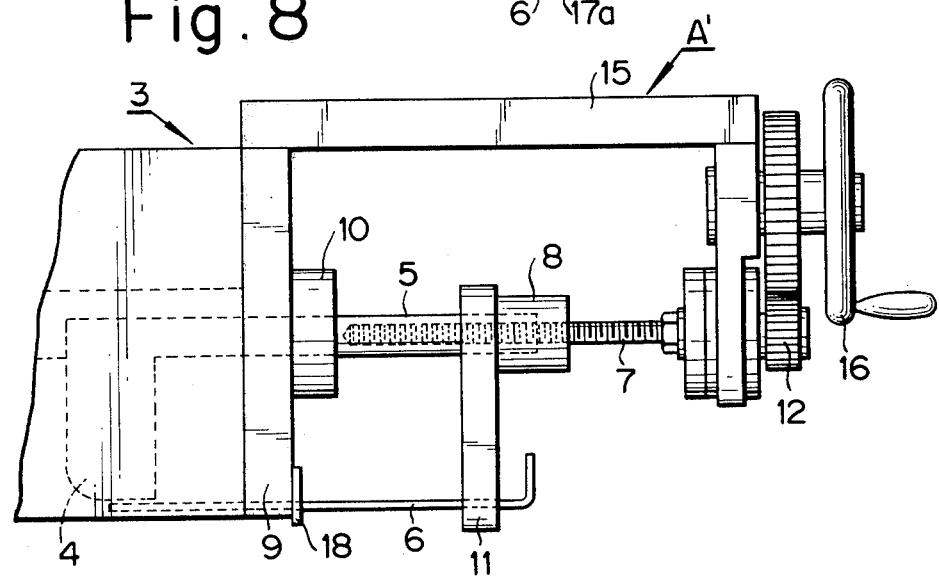

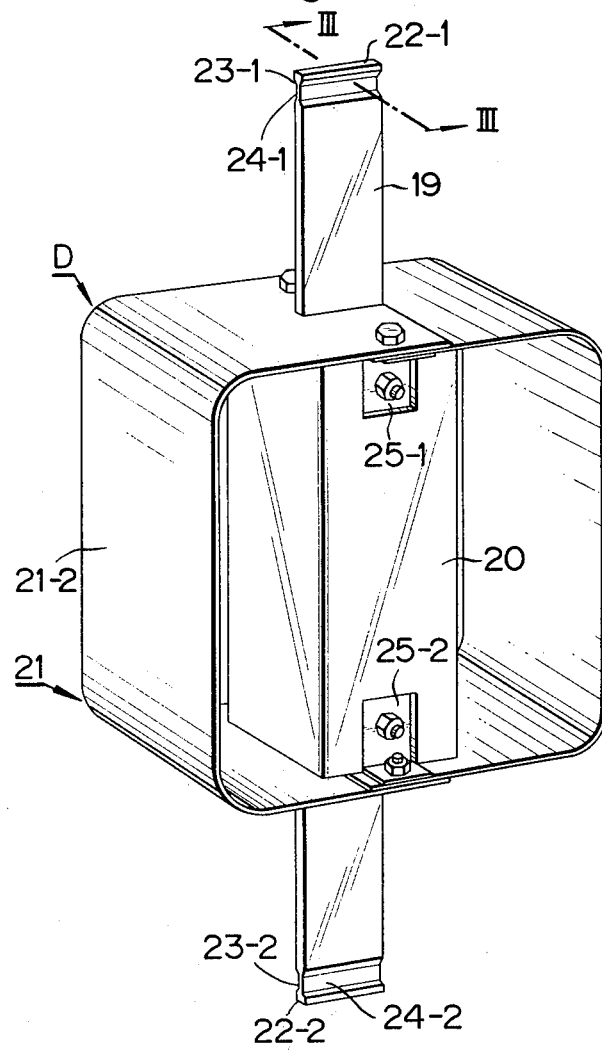
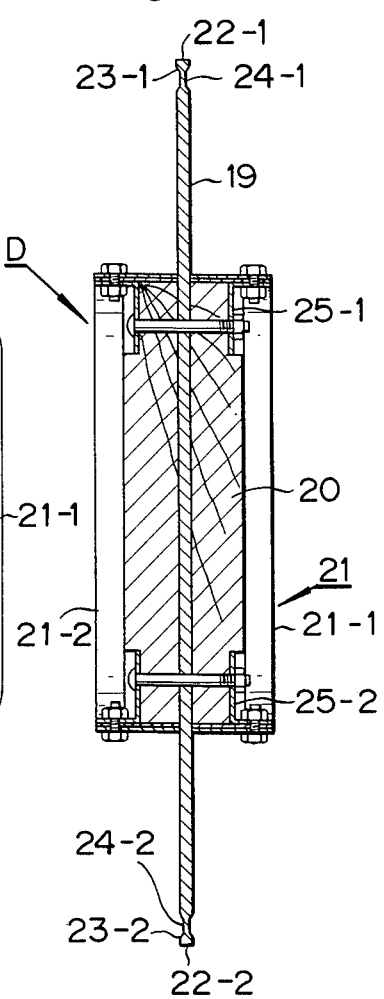

FILM EXTRUSION DIE

This invention relates to an improved T-shaped extrusion die adapted for extruding films or sheets of a thermally flowable plastic material such as a polyethylene resin and, more particularly, to an improved T-shaped extrusion die adapted for forming transparent, uniformly thick and edge beads-free resin films efficiently.

There are two methods for extruding resin films such as polyethylene or polypropylene films, one being an inflation method and the other a T-shaped die method. Of these two, the T-shaped die method have been widely used in manufacturing resin-made bags for fertilizers, moisture-proof bags or the like by laminating a not synthetic resin film with a metal foil, Cellophane paper or kraft paper and then pressing the whole together.

Figure 1:
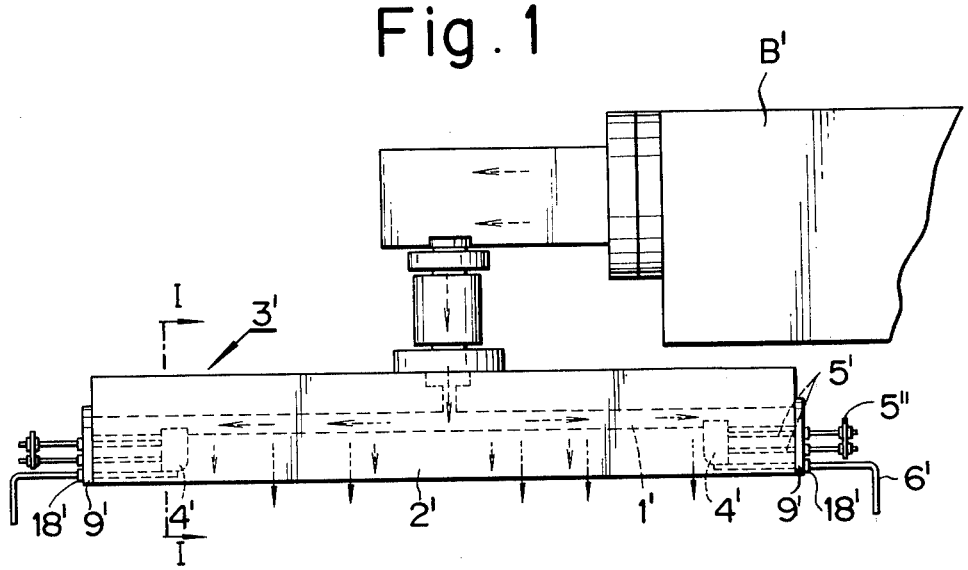
Figure 2:
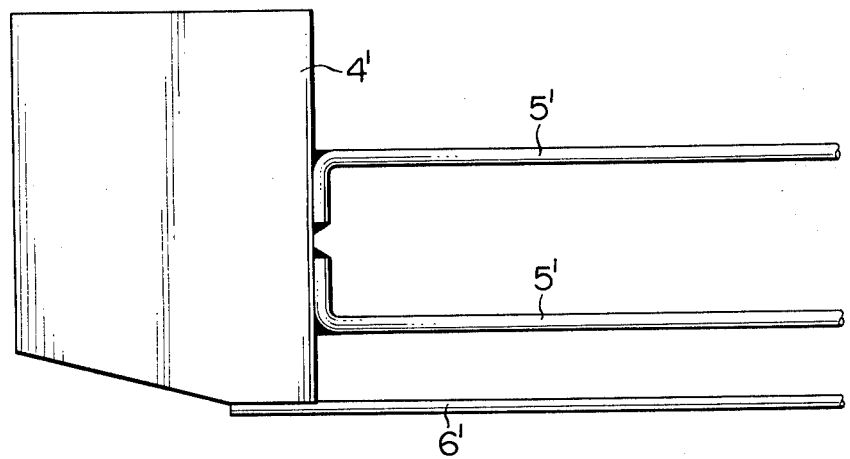
Figure 5:
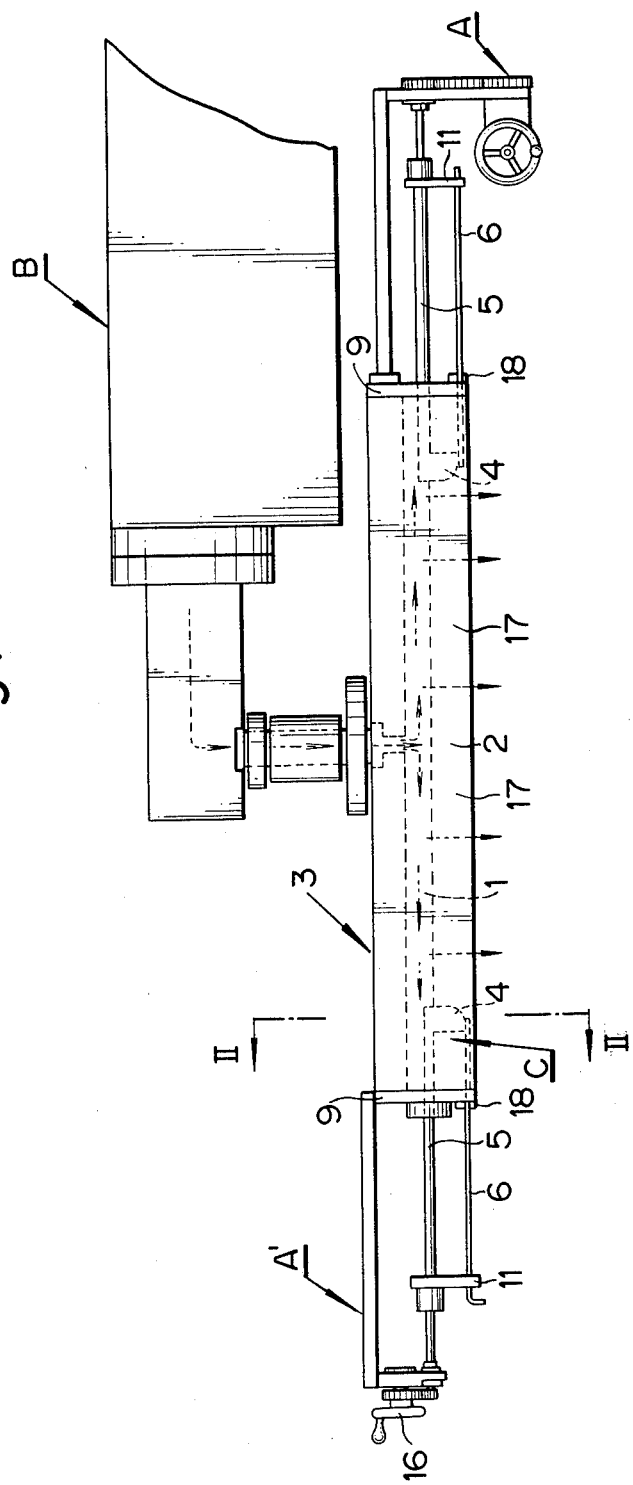
Figure 7:
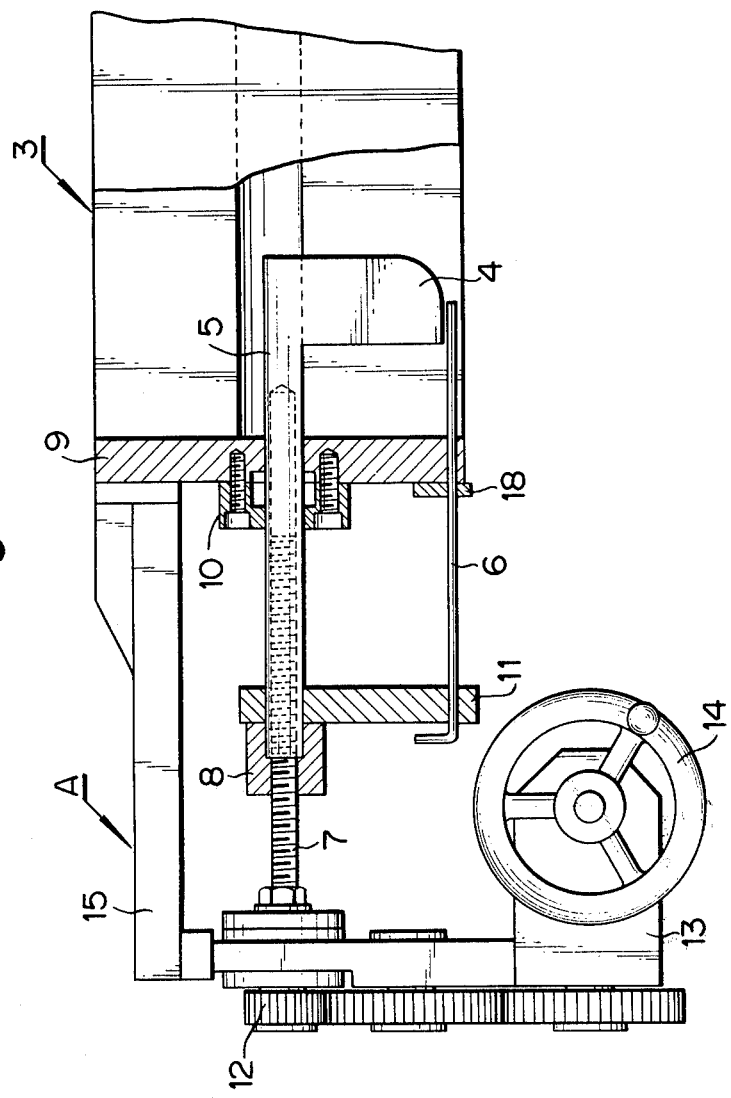

FIG. 1 is a front view of a conventional T-shaped extrusion die,

FIG. 2 is a side view of an inner deckle, in a magnified form, used in the die of FIG. 1, FIG. 3 is a cross-sectional view taken along the line I—I of FIG. 1, FIG. 4 is an enlarged view of the lower part of FIG. 3, FIG. 5 is a front view of a T-shaped extrusion die embodying the present invention, FIG. 6 is a cross-sectional view taken along the line II—II of FIG. 5, FIG. 7 is an enlarged view of a support rod-power driving device of the die of FIG. 5, FIG. 8 is an enlarged view of a support rod-operating device of the die of FIG. 5, FIG. 9 is a perspective view of a resin remover, and FIG. 10 is a cross-sectional view taken along the line III—III of FIG. 9.

As is shown in FIGS. 1–3, a conventional T-shaped extrusion die comprises an inner deckle means 4' at each end of the T-shaped die body 3', the two deckle means being adjustable to vary the edge thickness of the resulting extruded film thereby obtaining a uniformly thick resin film without regions of increased thickness along the edges of the film, such thick regions being hereinafter referred to as "edge beads". Each inner deckle 4' is supported by a L-shaped support rod 5' (FIG. 2) which is connected to a plate 5''. Further, an inner deckle rod 6' is provided just under each of the inner deckles in order to regulate the width of the resulting extruded film. The support rods 5', 5' are each attached to the inner deckle 4' in the slot or passage 2' of the die body 3', the deckle 4' being movable in the passage 2' away from, or towards, the end of the die body 3'. The molten resin from an extruder B' is introduced into the manifold 1' from which it is passed through the slot-like passage 2' and discharged from a discharge orifice 17'a in the long narrow slot form to produce a film; thus, the inner deckle 4' and inner deckle rod 6' at each end portion of the die body 3' suffer a very high resin pressure whereby the former is pushed downward against, and closely contacted with, the latter with the result that the movement of the inner deckle rod 6' is made very difficult or is sometimes made quite impossible. Thus, it will take an long time to regulate the width of the flowing resin by the use of the inner deckle rod 6' in such a sparingly movable state, or the extrusion molding operation will be suspended due to complete immovableness of the inner deckle rod 6' thereby decreasing the operational efficiency to a very great extent. Further, when the molten resin from the extruder B' is passed through the manifold 1', slot-like passage 2' and slot-like discharge orifice 17'a between the ends of the lips 17', 17' to be formed to a film which is then laminated with a substrate such as paper, the resulting laminate will have edge beads on both sides thereof. The edge beads (about 30 mm wide for example) are severed or cut from the laminate, and the edge beads so cut are blown off with a blower (not shown) and then wound as waste on a reel driven by a variable motor (not shown).

Furthermore, in the conventional T-shaped extrusion die in operation, the molten resin entering such a space as indicated at the symbol "X" in FIG. 4, will be solidified in contact with air and stuck to the surfaces surrounding said space X. The solidified resin so stuck will disadvantageously cause the molten resin from the extruder B' to form a non-uniform flow thereby obtaining a film having unsatisfactory transparency and non-uniform thickness unless the solidified resin is removed. Such a solidified stuck resin which would be an oxidized or scorched resin, has heretofore been attempted to be removed by inserting a rectilinear metal rod into the slot-like orifice 17'a for extruding the molten resin. However, it is difficult to carry out such removal smoothly since the rectilinear metal rod is heated because of the die body and molten resin being very hot, and it is impossible to remove the oxidized resin particularly present in such a space as designated at said X by the use of the linear metal rod, whereby a considerable time loss is caused in the overall film-forming operation. It should particularly be noted that the resulting films still have the aforesaid disadvantages since the oxidized or scorched resin cannot thoroughly be removed with the rectilinear metal rod.

The present invention has been made in an attempt to eliminate the foregoing disadvantages or drawbacks.

First of all, the functions of the main components of a T-shaped extrusion die of the present invention will be explained hereinbelow by reference to particularly FIGS. 5–8:

(1) Lips 17, 17

Two lips 17, 17 constitute therebetween a slot-like discharge orifice through which a molten resin under a high pressure (200–350 Kg/cm$^2$ for example) is extruded to be formed to a film (FIG. 6). The magnitude of the slot-like orifice between the ends of the lips may be varied or adjusted as desired by the use of lip adjustable bolts (not shown) provided on the outer sides of the die body, whereby the thickness of the resulting film may be adjusted.

(2) Manifold 1

A manifold 1 is centrally positioned in the die body, extends longitudinally thereof (FIGS. 5 and 6) and is circular, elliptical or like in cross-section. The molten resin from an extruder is spread throughout the manifold and then passed towards the slot-like orifice.

(3) Slot-like passage 2

A slot-like passage 2 through which the molten resin is passed is provided between the manifold and the slot-like orifice (FIG. 6).

(4) Inner deckle 4

An inner deckle 4 is provided at each end of the die body so that it extends from the manifold to near above the orifice (FIG. 6). The inner deckles are used to vary the edge thickness of the resulting extruded film although they would have some cooperative effect on regulation of the width by the inner deckle rods.

(5) Inner deckle rod 6

At each end of the die body, an inner deckle rod 6 is positioned between just above the slot-like orifice and the lower end of the inner deckle but is somewhat away from said lower end. The inner deckle rod is movable in conjunction with the inner deckle to regulate the width of the flowing molten resin thereby regulating the width of the resulting extruded film (FIGS. 6 and 8).

(6) Support rod 5 connected to inner deckle

At each end of the die body, a support rod 5, which is greater in diameter and strength than conventional ones to prevent it from bending due to the molten resin pressure, extends through the manifold and connected securely to the inner deckle to support it in position (FIGS. 6 and 8).

In the T-shaped extrusion die body according to the present invention comprising the manifold, slot-like passage and lips, the support rod connected to the inner deckle extends outward beyond the end of the die body and is provided at the outer end with a support rod-power driving device A by which the inner deckle is moved away from, or towards, the end of the die body to vary the edge thickness of the resulting extruded film. This support rod for supporting the inner deckle is positioned so that is may be moved in sliding contact with the wall of the manifold as shown in FIG. 6. Further, the inner deckle rod is positioned a certain distance away from the inner deckle to ensure free movement thereof in conjunction with the inner deckle even during the extrusion operation in which a very high resin pressure is applied to the inner deckle, support rod therefor and inner deckle rod, as shown in FIGS. 6 and 8.

The features of the extrusion die of the present invention will be summarized as follows.

(1) The die is provided with a support rod-power driving device A (including a minigeared motor) at one end of the die body and with a support rod-operating device A' at the other (FIGS. 5, 7 and 8).

(2) The support rod 5 is positioned so that it may be moved in sliding contact with the whole or a part, in cross-section, of the wall of the manifold 1 as shown in FIG. 6.

(3) The inner deckle 4 and the inner deckle rod 6 are designed to be supported so that they are kept a certain distance away from each other even under a very high pressure of the molten resin as is seen from FIGS. 6–8. The distance or gap between the inner deckle 4 and side plate 9 in the slot-like passage 2 will be oxidized or scorched since the molten resin passing through the space C is decreased in amount and pressure, whereby the inner deckle rod 6 is stuck in the oxidized or scorched resin and cannot be moved; on the other hand, if the gap be larger than 0.5 mm, then the resin entering-said space C has a very high resin pressure thereby rendering the movement of the inner deckle rod 6 difficult.

The present invention will be better understood by reference to the accompanying drawings in which FIGS. 5-10 are explained before.

As is seen from FIGS. 5 and 6, the molten resin from the extruder B is introduced into the manifold 1 from which it is passed through the passage 2 and then extruded through the slot-like discharge orifice 17a to form a film. The inner deckle is provided at each end of the die body 3 in which the manifold 1, passage 2 and slot-like orifice 17a are included, thereby to vary the edge thickness of the resulting extruded film.

The support rod 5 connected to the upper part of the inner deckle 4 extends beyond one end of the die body 3 and is associated with the support rod-power driving device A, while the opposing support rod extending beyond the other end of the die body 3 is connected to the support rod-operating device A'. The support rod 5 should be so large in diameter that it may be moved in sliding contact with the whole or a part of the wall of the manifold (FIG. 6). The inner deckle rod 6 is provided just under, and a predetermined distance (0.1–0.5 mm for example) away from, the lower end of the inner deckle 4 to prevent the inner deckle 4 from contacting with the inner deckle rod 6 even under a very high pressure of the molten resin.

The support rod-power driving device A and the support rod-operating device A' will be detailed hereinbelow.

The device A (FIG. 7) may be remote-controlled or remote-operated with a push button (not shown) provided at the side of the device A'. As is seen from FIGS. 7 and 8 the support rod 5 is hollow and internally threaded at the side far from the inner deckle, and it is engaged with a male screw 7. The male screw 7 is engaged with a female screw 8 and the externally threaded outer end portion of the support rod 5 is also engaged therewith. The die body 3 is provided at each end with a side plate 9, and a packing gland 10 is securely attached to the support rod 5 and the side plate 9 to prevent leakage of the molten resin. The support rod 5 and the inner deckle rod 6 are supported by a holder 11. The male screw 7 is connected directly to an acceleration gear 12 and indirectly to a minigeared motor 13 and handle 16. The acceleration gear 12 and the side plate 9 are securely held by a support 15. Since the support rod-power driving device A may be manually operated or remote-operated by an operator at the side of the support-rod operating device A', the operator at said side may also mechanically move the inner deckle and inner deckle rod 6 at the side of the device A when in, or out of, operation thereby regulating the edge thickness and width of the resulting extruded resin film. Since the device A includes a handle 14, it may be remote-operated or manually operated.

In the support rod-operating device A' (FIGS. 5 and 8), a packing gland 10 for preventing leakage of the resin is securely attached to the support rod 5 and a side plate 9 as in the device A. The support rod 5 and the inner deckle rod 6 are supported by a holder 11 as in the device A. A male screw 7 engaged with the support rod 5 is connected to an acceleration gear 12 which is engaged with an handle 16, as in the device A. A support 15 is provided as also in the device A.

The function and operation of the T-shaped extrusion die will be detailed hereinbelow.

The molten resin extruded under a high pressure from the extruder B is passed through the manifold 1 in which the support rod 5 may be moved in sliding contact with the wall of the manifold along the longitudinal axis thereof, and the inner deckle 4 and inner deckle rod 6 are kept a predetermined distance away from each other as shown particularly in FIG. 6, whereby the resin flow into the C space (FIG. 5) between the inner deckle 4 and the side plate 9 is so limited that scorching of the resin entering the C space is minimized and close contact of the inner deckle 4 with the inner deckle rod 6 due to the high pressure of the entering resin is prevented operation thereby causing no troubles in the edge thickness and width regulating unlike in the conventional T-shaped extrusion dies. The width regulation when the die is in, or out of, operation, may be easily carried out by operating the handle 16 by an operator at the side of the support rod-operating device A', while the support rod-power driving device A may be easily remote-operated by the operator at the side of the device A'. The support 15 at each of the devices A and A' is provided with a millimeter unit scale (not shown) while the female screw 8 is provided with a pointer cooperating with the said scale for measuring the width.

Since the inner deckle 4 and the inner deckle rod 6 are positioned a predetermined distance (0.1–0.5 mm for example) away from each other and the former will therefore not contact with the latter even when the high resin pressure is applied to the former as previously mentioned, the inner deckle rod 6 may be easily operated during the die operation whereby the width regulation may be conducted very smoothly. In this manner, the width-regulated flowing resin is then passed through the passage 2 and the orifice 17a to form a film which is taken on a reel. Screws (not shown) which are provided on the sides of the die body and used to move the lips 17, 17 for regulating the magnitude of the slot-like orifice (the aperture between the ends of the lips 17, 17), are of a double screw type and may therefore be used in adjusting the magnitude of the slot-like orifice very easily.

The various components and devices of the T-shaped extrusion die of the present invention may be made of a metal, for example, stainless steel for the lips.

It has further been found by the present inventor that the oxidized or scorched resin firmly stuck to the wall of such a space of the die body as indicated at X in FIG. 4 may be conveniently and thoroughly removed by a specific resin remover which will be explained hereinbelow.

The resin remover used herein comprises, as the essential component, a square rod having a specific configuration at least one end portion thereof and, as the optional components, a grip attached to said square rod so that the former surrounds the central portion of the latter, and a burn protector secured to the grip as shown in FIGS. 9 and 10. At least one end portion of the square rod is so formed that the cross-section thereof is the same as that of the region including the slot-like orifice and the lower end portion of the slot-like passage for the molten resin.

The resin remover D will be detailed hereinbelow by reference to FIGS. 9 and 10.

The resin remover D comprises a square rod 19 having at least one specifically shaped end portion, a grip 20 and a protector 21 against burn. The square rod 19 (preferably rectangular in cross-section) which may be made from a metal, has at least one end portion wherein numerals 22-1 (or 22-2), 23-1 (or 23-2) and 24-1 (or 24-2) indicate the end, tapered portion and reduced portion. The taper angle of the tapered portion 23-1 (or 23-2) is preferably the same as the angle made by the passage 2 and the lip 17 as is seen from FIG. 6 and the thickness of the reduced portion 24-1 may be equal to, or somewhat smaller than, the width of the orifice (or slot) 17a so that this reduced portion is passable through the orifice.

The square rod 19, which is a resin remover body, becomes hot by heat conduction from the high-temperature resin during the oxidized or scorched resin removal operation. Thus, it is desirable or necessary to cover the square rod 19 with a grip 20 which is made of a non-conductive or sparingly conductive material such as wood. The grip 20 may be such that it surrounds the square rod 19 and is fixed thereto by bolting through L-shaped metal fittings 25-1 and 25-2.

When a worker is engaged in removing oxidized or scorched resin, it is likely that the molten resin will splash onto his hands and he will accidentally touch the hot die body by hand whereby he suffers burn. Thus, a burn protector 21 may preferably be secured to the square rod 19 so that it partly covers the grip 20 as indicated in FIGS. 9 and 10. The burn protector 21 may be stainless steel sheets 21-1 and 21-2 which are bent to be overlapped at their ends and bolted through the L-shaped fittings 25-1 and 25-2 at the overlapped portions. The space between the grip 20 and burn protector 21 should be large enough to permit human hand to hold the grip 20. The grip 20 and the burn protector 21 are secured to each other by the use of the L-shaped metal fittings 25-1 and 25-2. The burn protector 21 may be of a box type as shown in FIG. 9, of a semi-sphere type or of any other suitable type.

The resin remover D is used in the following manner.

The oxidized or scorched resin usually deposits in a space particularly defined by the lower end of the inner deckle 4 and the inner walls of the lips 17, 17 (FIG. 6), the space corresponding to the X space in FIG. 4.

First of all, a piece 18 bolted on the side plate 9 (FIG. 5) is released from the die body 9 and the inner deckle rod 6 is then withdrawn therefrom. The square rod end portion including the end 22-1, tapered portion 23-1 and reduced portion 24-1 (FIG. 9) is inserted into said particularly defined square and moved to and fro therein thereby to remove the oxidized or scorched resin deposited therein. The piece 18 may be readily releasably attached to the side plate 9.

Because of its specific construction, the use of the T-shaped extrusion die of the present invention is effective in obtaining the following advantages.

(1) The T-shaped extrusion die of the present invention provides extruded resin films substantially without edge beads thereby eliminating the need for trimming the edges of the extruded films, and the films may therefore be obtained at a low production cost with economy of electric power, (2) An unintended suspension of the extrusion operation may be avoided since close contact of the inner deckle with the inner deckle rod is prevented, whereby the operation is carried out with an increased efficiency, (3) An edge beads cutter, a blower for blowing off the cut edge beads, a reel for the cut edge beads, and the like are dispensed with, thereby obtaining economy of electric power, (4) The operation for regulating the edge thickness of the resulting extruded resin film may be carried out by simple handle operation along with the use of a scale for measurement of inner deckle movement and the remote-controllability of the support rod-power driving device, whereby human labor is saved and even a beginner operates the extrusion die satisfactorily because of dispensability with skill in regulating the width of the resulting extruded film. The operation for regulating the width of the resulting extruded film may also easily be carried out by the simple handle operation after the inner deckle rod has been set in conjunction with the inner deckle, (5) Oxidized or scorched resin deposited at such portions in a die body as conventional resin removers do not reach may be easily and thoroughly removed, and burn or the like during the resin removal operation may also be avoided by the use of the resin remover according to the present invention, and (6) The resulting extruded films will have remarkably high transparency and uniform thickness at every part thereof without edge beads.

(7) Sliding contact of the support rod with the whole, in cross-section, of the surface of the manifold is also useful for cleaning the surface, that is, removing the resin deposited thereon.

What is claimed is:

1. In a T-shaped extrusion die for extruding films of thermally flowable synthetic resin at a high pressure, comprising (1) a die body having a manifold for containing a supply of the synthetic resin in molten state and a slot-like passage for passing the molten synthetic resin towards a slot-like discharge orifice, (2) adjustable lips for forming the slot-like discharge orifice of any desired size between their lower ends, (3) inner deckles for varying the edge thickness of the resulting extruded film, movable perpendicularly to the resin flow and within the slot-like passage at the end portion of the die body, respectively, and (4) inner deckle rods for regulating the width of the resulting extruded film, movable below the inner deckles in conjunction therewith, parallel to the moving directions of the inner deckles and within the slot-like passage at the end portions of the die body, respectively, said extrustion die characterized in that one of the inner deckles being securely connected to, and supported by, a support rod extending through the manifold beyond one end of the die body and provided at the outer end with a support rod-power driving device for moving the support rod in sliding contact with the surface of the manifold, the other being securely connected to, and supported by, a similar support rod extending through the manifold beyond the other end of the die body and provided at the outer end with a support rod-operating device for moving the other support rod in sliding contact with the surface of the manifold, the support rod-power driving device being manually operable or remote-operable at the side of the support rod-operating device, and the inner deckle and the mating inner deckle rod being kept a predetermined distance away from each other thereby to permit the latter to move easily without being closely contacted with the former during the high-pressure extruding operation.

2. A T-shaped extrusion die according to claim 1, wherein the predetermined distance between the inner deckle and the inner deckle rod is 0.1-0.5 mm.

3. A T-shaped extrusion die according to claim 1, wherein said support rod-power driving device comprises a long male screw engaging at one end with the internally threaded portion of the support rod and connected at the other end to an acceleration gear, a minigeared motor engaging with the acceleration gear and a handle to operate the minigeared motor.

4. A T-shaped extrusion die according to claim 1, wherein said support rod-operating device comprises a long male screw engaging at one end with the internally threaded portion of the similar support rod and connected at the other end to an acceleration gear and a handle to operate said acceleration gear.

5. A T-shaped extrusion die according to claim 1, wherein the support rod and inner deckle rod in each of the support rod-power driving device and support rod-operating device are supported by a common holder.

6. A resin remover for use in a T-shaped extrusion die for extruding films of thermally flowable synthetic resin at a high pressure, comprising (1) a die body having a manifold for containing a supply of the synthetic resin in molten state and a slot-like passage for passing the molten synthetic resin towards a slot-like discharge orifice and (2) adjustable lips for forming the slot-like discharge orifice of any desired size between their lower ends, the resin remover comprising a square rod at least one of the end portions of which is so formed that the cross-section of the end portion is the same as that of the region including the slot-like discharge orifice and the lower end portion of the slot-like passage for the molten resin, a grip attaching to, and surrounding, the central portion of said square rod, and a burn protector secured to, and partly covering, the grip so that the space between the grip and protector is large enough to permit a human hand to hold the grip.

* * * * *